July 23, 1968     G. AMIR     3,394,389

PIECE POSITIONING DEVICES

Filed Oct. 18, 1965     3 Sheets-Sheet 1

July 23, 1968

G. AMIR 3,394,389

PIECE POSITIONING DEVICES

Filed Oct. 18, 1965

3,394,389
PIECE POSITIONING DEVICES
Giora Amir, Southsea-Portsmouth, Hants, England, assignor to Protechno, Courbevoie, Hauts-de-Seine, France, a corporation
Filed Oct. 18, 1965, Ser. No. 497,038
Claims priority, application France, Oct. 20, 1964, 992,005
1 Claim. (Cl. 269—84)

ABSTRACT OF THE DISCLOSURE

A device for positioning a plurality of workpieces relative to one another in which a first head member which maintains a workpiece is mounted for rotation about an axis of a stationary base member and a second head member which maintains a second workpiece is mounted for rotation on the base member about an axis parallel to the axis of the first head member. Each head member includes a gripping block rotatable relative to the base and cooperating gripping means slidable relative to the block and carrying actuating means to effect a work-gripping operation.

---

The present invention relates to a positioning device for workpieces, hereafter referred to as pieces, or like articles.

It is frequently required in the industry to place two pieces or articles in comparatively accurate positions relative to one another.

Bulky and complicated positioning devices are well known in the art, adapted to position large-size pieces or articles in relation to one another.

It is a main object of the invention to provide a positioning device, adapted to be used in particular in the artisan's work-shop, as well as in work-shops for producing prototypes and in industrial shops, which, while being of simple construction and reduced size, assures an accurate positioning of the pieces, to enable their assembly by welding or brazing, while also it easily utilized and has a wide field of use.

In accordance with the invention there is provided a positioning device for a workpiece which comprises a base member on which a maintaining block is pivotally supported. A workpiece maintaining device is slidably mounted on the base member and comprises a first post adapted to cooperate with the block for maintaining therebetween a workpiece and a second post carrying adjustable stop means cooperating with said block for providing a counter-reaction to the application pressure of the first post against the workpiece.

The invention will be best understood from the following description and appended drawings, wherein.

Figure 7:
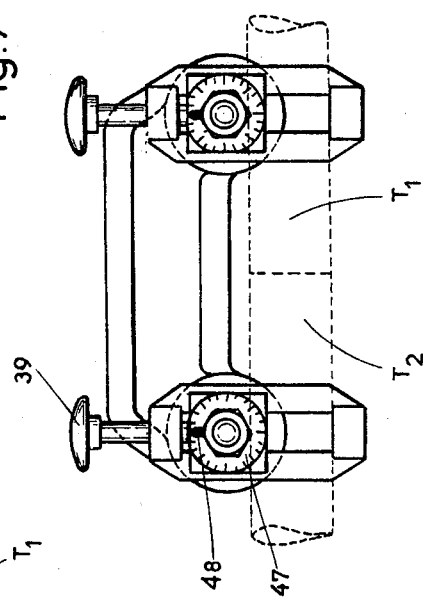
FIGURE 7 is a view similar to FIGURES 1 and 6, but for still a different operating condition.

Referring now to the drawings, the apparatus according to the embodiment illustrated, comprises generally a base member or sole 10 including a body 11 terminated with two circular bed-plates 12 and 13, the centers 14 and 15 of which are off-set relative to the median line of body 11. Base-plates 12 and 13 support, respectively, head members 16 and 17; the construction of these head members being similar, a single one thereof will be described in more detail.

Head member 17 is comprised of a central supporting or maintaining block 18 of a generally parallelepiped shape, formed with side faces 19, 20, 21 and 22. Block 18 bears with its lower flat face 23 on upper face 24 of base-plate 13. Block 18 (FIGURE 2) has an axial bore 25 receiving shank 26 of a bolt 27 formed with a head portion 28 accommodated in a cavity 29 provided in the lower part of base-plate 13. Nut 30 carried by the bolt cooperates with the threaded portion of said shank 26, locking block 18, upon tightening relative to base 13, whereas when nut 30 is untightened, block 18 is allowed to be rotated with respect to said base, about the axis of shank 26.

Two opposite faces of block 18 form resting faces differing in type, for positioning pieces of different nature and/or type and/or different sizes. In the arrangement illustrated in FIGURES 2 and 3, face 19 is formed with two resting areas 31 and 32, in slanted relationship to face 23, and defining a comparatively shallow, V-shaped, slotted portion in block 18, whereas, on the opposite face, two equally slanted cut-out areas 33 and 34 are provided, defining a deeper notch therein. In addition, face 18 is formed, in a central area thereof, with a blind hole 35 the axis of which is parallel to face 23 and perpendicular to the axis of bore 25; similarly, face 21 is formed with a blind hole 36 the axis of which is in alignment with that of blind hole 35. The latter serves to accommodate the end portion 37 of a screw spindle 38, said end portion resting against bottom 35' of blind hole 35 and which terminates, at the opposite side, with an actuating knob 39. Screw-spindle 38 cooperates with threading 40 provided on a post member 41 of a mobile resting piece 42 slidingly arranged with its base 43 on base 13. Said sliding member 42 carries at its opposite end a second post 44 formed with a threading 45, in axial alignment with threading 40. It encompasses block 18 with the legs or branches such as $42_1$, $42_2$ connecting posts 41 and 44.

Figures 2, 3:
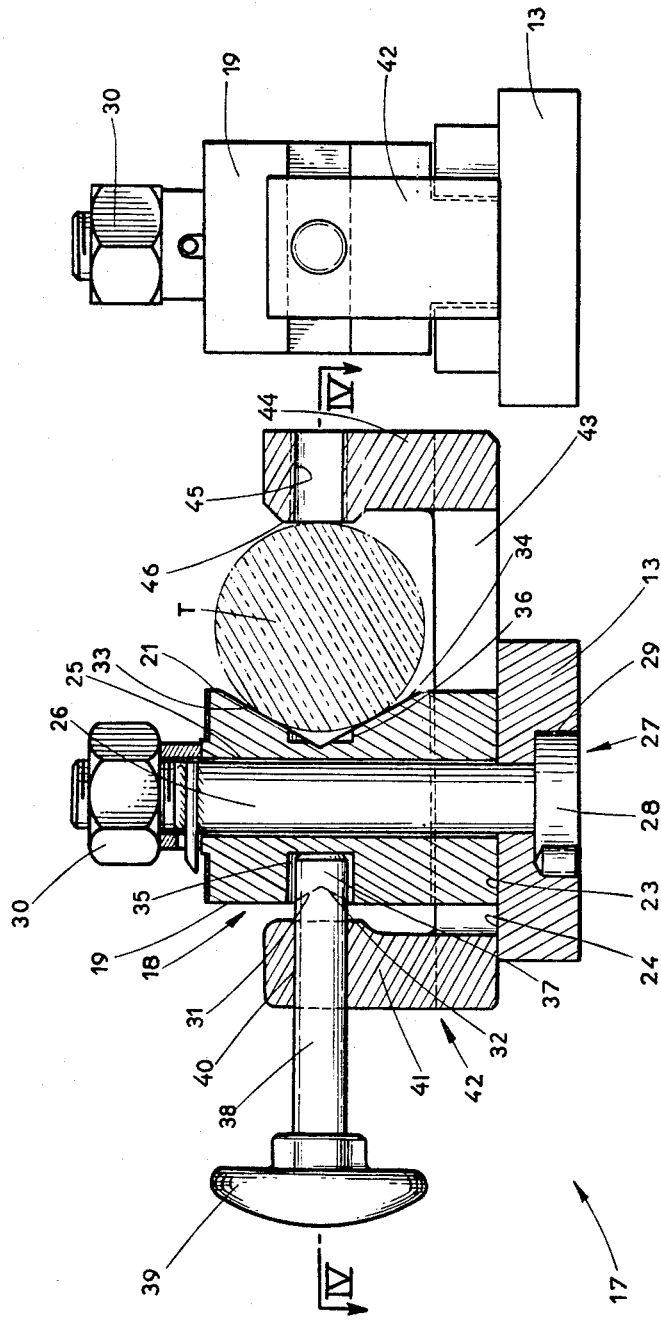
FIGURE 2 is a vertical cross-sectional view of the device, at an enlarged scale.
FIGURE 3 is an elevational view, at right angles to that of FIGURE 2, the actuating device being omitted.
Figure 4:
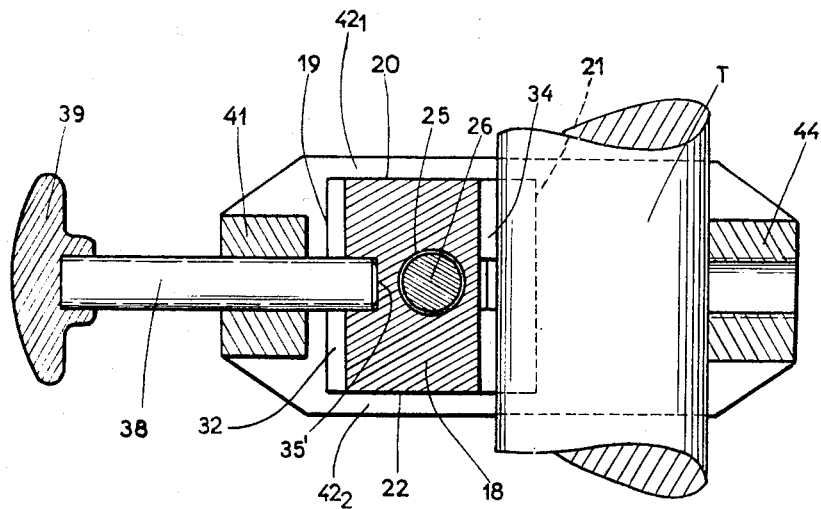
FIGURE 4 is a cross-sectional view of the device taken along line 4—4 of FIGURE 2.

In FIGURE 2, the head member 17 represented is adapted to support a tube or rod T to be positioned, of a comparatively large diameter which bears against the notches 33 and 34 of the large cut-out portion, pressure applied onto said notches being provided by front face 46 of post 44 of sliding member 42, urged through cooperation of screw-spindle 38 with threading 40 of post 41, knob 39 being actuated in the convenient direction for the front piece 46 to bear against tube T, the counter reaction being provided by bottom 35' of blind hole 35.

Figure 1:
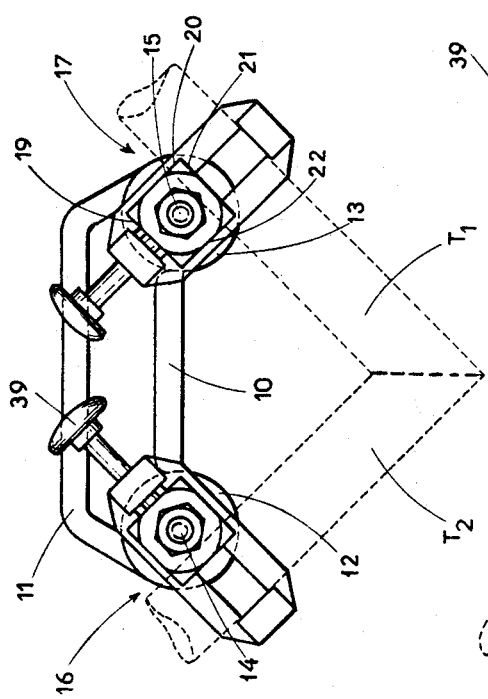
FIGURE 1 is a plan view of the device according to the invention.

In FIGURE 1, there is illustrated the apparatus of the invention with heads 17 and 16 adjusted respectively for positioning two tubes $T_1$ and $T_2$ adapted to form therebetween an angle of 90°. To this end, bearing blocks 18 (FIG. 2) of heads 16 and 17 have been angularly adjusted about the respective axes of the shanks 26 (FIG. 2).

Figure 6:
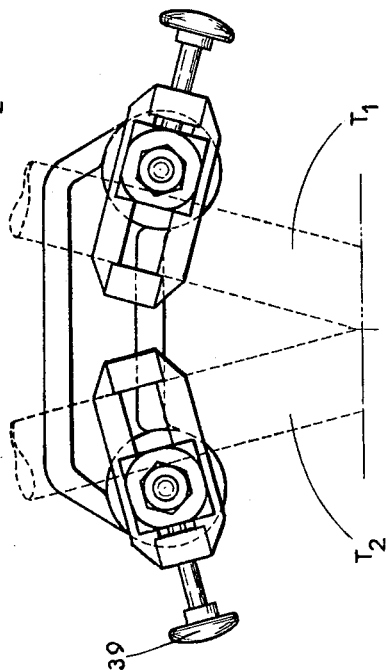
FIGURE 6 is a view similar to FIGURE 1, but for a different operating condition.

In the operating condition illustrated in FIGURE 6, the bearing blocks have been adjusted such that the angle between tubes $T_1$ and $T_2$ is 30°.

In the position shown in FIGURE 7, the tubes $T_1$ and $T_2$ are in alignment relationship; a scale is provided at 48 in front of which a pointer 48 is movable, enabling a rapid and accurate adjustment.

Figure 5:
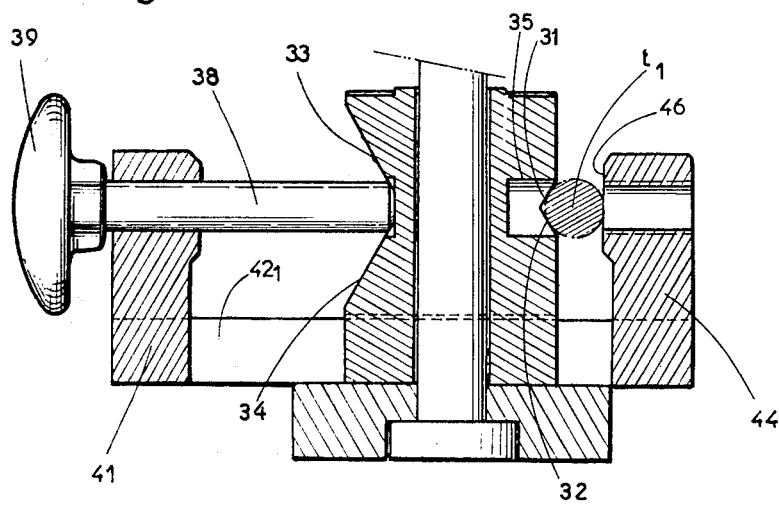
FIGURE 5 is a view similar to FIGURE 2, but for a different operating condition.

Referring now to FIGURE 5, there is shown an operating condition, wherein one of the head pieces is adapted to position a small-size piece. Such a piece, for instance a tube $t_1$ is then maintained by bearing against planes 31 and 32 of the comparatively shallow cut-out, the condition illustrated in the figure differing from that shown with reference to FIGURE 2, by a 180° rotation of block 18 about the axis of shank 26.

The positioning of small-size pieces or articles may be effected according to different relative angular positions under conditions similar to those of the positioning of large-size pieces, the positioning device enabling two pieces or articles to be positioned under any given angle.

The figures illustrates the device according to the invention for positioning pieces or articles of a circular cross-section; it is however to be understood that the invention applies also to the positioning of pieces of any shape, and particularly of sectional or flat shapes.

What is claimed is:

1. A piece-positioning device comprising, a base member, pivoting means carried by said base member, a maintaining block mounted for rotation about said pivoting means on said base member, a piece-maintaining device slidingly mounted on said base member comprising a first post adapted to cooperate with said block for maintaining therebetween a piece and a second post carrying adjustable stop means cooperating with said block for providing a counter-reaction to the application pressure of said first post against the piece.

References Cited

UNITED STATES PATENTS

| | | | |
|---|---|---|---|
| 1,144,828 | 6/1915 | Fegley | 269—84 X |
| 1,278,419 | 9/1918 | Bader | 269—47 |
| 1,332,398 | 3/1920 | Hoagland | 269—244 |
| 2,803,208 | 8/1957 | Bernard | 269—45 |

ROBERT C. RIORDON, *Primary Examiner.*

J. F. McKEOWN, *Assistant Examiner.*